Patented Aug. 13, 1940

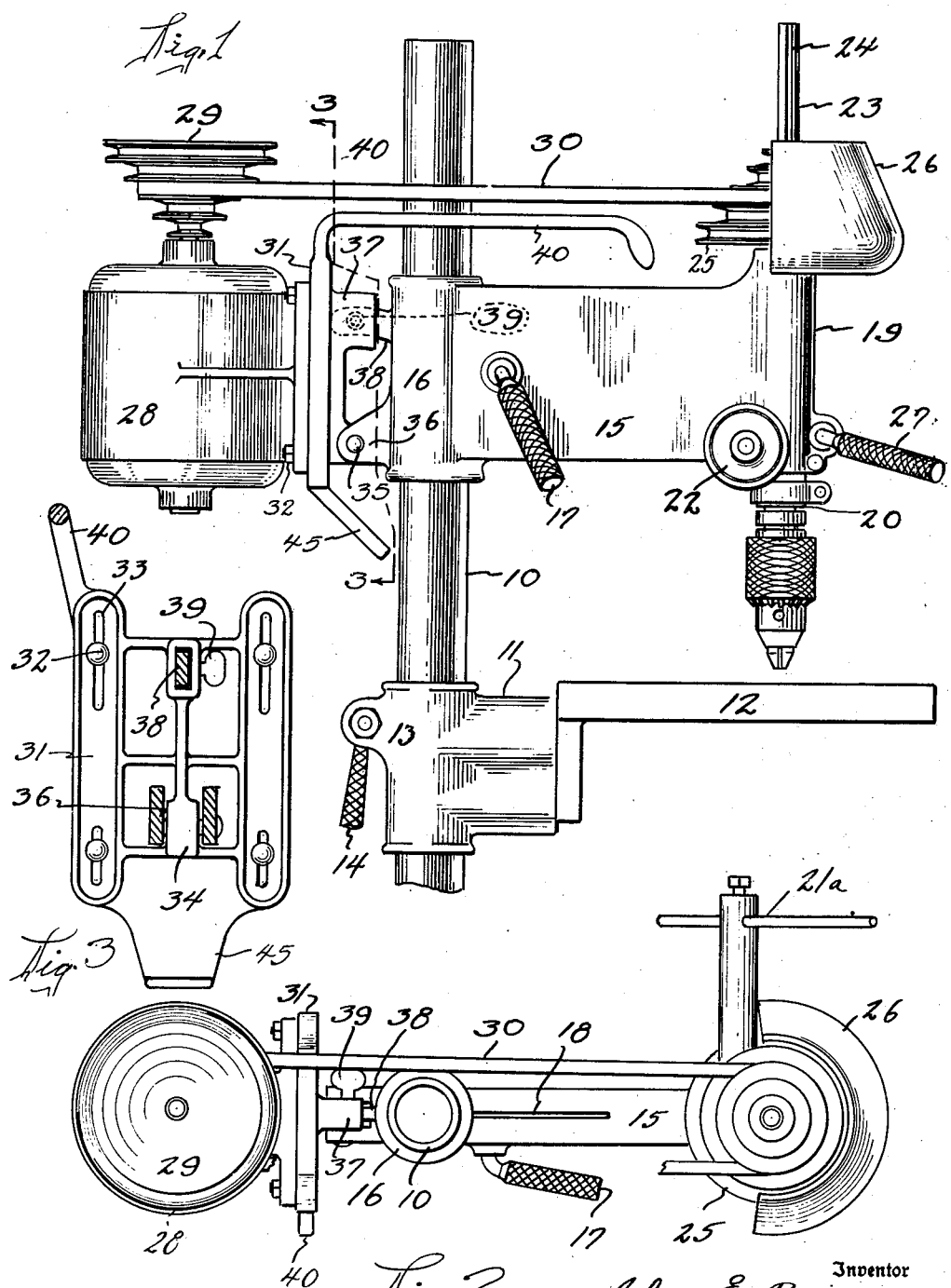

2,211,050

UNITED STATES PATENT OFFICE 2,211,050

WOODWORKING MACHINE

John E. Boice, Toledo, Ohio

Application February 2, 1937, Serial No. 123,651

2 Claims. (Cl. 248—16)

The invention relates to drill presses, particularly of a type for use by hobbyists, and aims to provide a drill press that is easily convertible to various uses, such as drilling wood, drilling metal, shaper work, etc. The invention is directed particularly to the problem of easy shifting of the belt drive so as to change the speed ratio between the driving and the driven pulley. To this end, it provides a motor that is swingingly mounted on the frame of the press in such a manner that gravity, i. e., the weight of the motor, keeps the belt taut, and which may be moved to a position to release the belt by simply grasping a lever and pulling toward the operator.

Other objects of the invention will appear in connection with perusal of the following detailed description in connection with the accompanying drawing, in which:

Fig. 1 is a side elevation of a press embodying the invention,

Fig. 2 is a plan view of the same, and

Fig. 3 is a sectional view taken on the line 3—3 of Fig. 1.

The invention may be embodied in either a bench type machine or a pedestal type, the latter being illustrated in the drawing. The pedestal shaft is indicated at 10. Slidably mounted thereon by means of a bracket 11 is a bed 12. The bracket 11 includes a split sleeve 13 snugly receiving the shaft 10 and adapted to be tightened thereon by a lever screw 14.

The drilling mechanism is carried by a bracket 15 which has a split sleeve 16 receiving the shaft 10 and adapted to be tightened thereon by means of a lever screw 17. The split 18 in the sleeve 16 extends into the bracket portion 15 as shown in Fig. 2.

At the other end of the bracket 15 is the bearing sleeve 19 in which is slidably mounted the spindle bearing 20. The latter is moved up and down by a conventional rack, pinion and lever arrangement 21a and a spring retracting mechanism 22. The spindle shaft 23 is journalled in the bearing 20 and is slidably keyed into a multiple pulley 25 by means of a keyway 24. The pulley 25 is partially encased in a guard visor 26 formed integrally with the sleeve 19. A handscrew 27 is employed to tighten the sleeve 19 against the bearing 20 for holding the latter in a fixed position of adjustment.

The motor 28 has a multiple pulley 29 which drives the spindle pulley 25 through the medium of a belt 30. The motor is secured to a bracket 31 by means of bolts 32 adjustably received in slots 33 in the bracket. At the lower region of the bracket 31 is a lug 34 which is pivoted on a pin 35 supported between two ears 36 formed on the sleeve 16. Above the lug 34 is a socket 37 which receives a finger 38 formed on the sleeve 16 concentrically with the pin 35. A set screw 39 is threaded through the socket 37 and engages the finger 38 to lock the motor bracket in any desired position of adjustment.

A handle 40 is formed on the bracket 31. The operator may grasp the handle by reaching from his normal position in front of the machine, and may by simply pulling it toward him, instantly release the belt so that the latter may be easily shifted onto other pulleys to change the speed ratio. Before doing so, the set screw 39, if it is locked, must be loosened. Where frequent changes are being made, the machine may be operated perfectly without employing the set screw, i. e., allowing the weight of the motor to be carried by the belt. If the operator does not wish to make any changes, the set screw may be employed to take part of the load from the belt, leaving just enough tension in the belt for proper operation.

The position of the fulcrum pin 35 is such that the weight of the motor is distributed between the pin and the belt, the greater load being carried by the pin, and ample load being given to the belt to assure plenty of tension in the belt for operating purposes.

In order to limit the range of movement of the motor away from the pedestal, there is provided a toe 45 which is adapted to engage the shaft 10.

I claim as my invention:

1. In a machine of the class described, a support, a bracket pivoted near its lower end to said support on a horizontal axis located at one side of said support, a motor secured to said bracket with its center of gravity located above said axis, said bracket at its lower end being provided with an integral stop member projecting toward the support, below said axis, normally spaced slightly from the support, and adapted to engage the support for limiting the pivotal movement of the bracket away from the support, said bracket at its upper end being provided with a handle adapted to be engaged by the operator for moving the bracket toward the support.

2. In a drill press, a pedestal shaft, a spindle bracket vertically slidable thereon and adapted to be secured thereto, a motor bracket pivoted near its lower end to said spindle bracket on a horizontal axis and having a stop member projecting below said axis toward said pedestal shaft for engagement therewith so as to limit the pivoting movement of said motor bracket, a motor pivoted to said motor bracket, with its center of gravity disposed above and to one side of said axis, and a handle on said motor bracket for moving the same toward the pedestal shaft.

JOHN E. BOICE.